United States Patent
Walker

(10) Patent No.: US 6,459,789 B1
(45) Date of Patent: Oct. 1, 2002

(54) PROCESS FOR DETERMINING AN ECHO COUPLING FACTOR AND THE ECHO DELAY TIME IN A BIDIRECTIONAL TELECOMMUNICATIONS SYSTEM

(75) Inventor: Michael Walker, Baltmannsweiler (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/427,488

(22) Filed: Oct. 27, 1999

(30) Foreign Application Priority Data

Oct. 31, 1998 (DE) .......................................... 198 50 271

(51) Int. Cl.[7] .............................................. H04M 9/08
(52) U.S. Cl. ............................ 379/406.01; 379/406.02; 379/406.03; 379/406.05; 379/406.08; 379/406.09; 379/406.04
(58) Field of Search .................................. 379/400–412

(56) References Cited

U.S. PATENT DOCUMENTS

| | | | |
|---|---|---|---|
| 5,363,441 A | * 11/1994 | Feiner et al. ................ | 379/406 |
| 5,535,194 A | * 7/1996 | Ashley et al. ............... | 379/406 |
| 5,570,423 A | 10/1996 | Walker et al. | |
| 5,631,900 A | * 5/1997 | McCaslin et al. ....... | 379/406.01 |
| 5,799,078 A | * 8/1998 | Mauer ........................ | 379/410 |
| 5,884,194 A | * 3/1999 | Shiraki ....................... | 455/570 |
| 5,901,230 A | * 5/1999 | Walker ................... | 379/388.07 |
| 5,920,548 A | * 7/1999 | Ei Malki .................... | 379/410 |
| 6,212,273 B1 | * 4/2001 | Hemkumar et al. ........ | 379/410 |

FOREIGN PATENT DOCUMENTS

| | | |
|---|---|---|
| DE | 42 29 910 A1 | 3/1994 |
| DE | 43 05 256 A1 | 8/1994 |
| DE | 197 14 966 A1 | 10/1998 |
| EP | 0 604 870 A2 | 7/1994 |
| EP | 0 592 787 B1 | 12/1998 |

* cited by examiner

Primary Examiner—Forester W. Isen
Assistant Examiner—Ramnandan Singh
(74) Attorney, Agent, or Firm—Sughrue Mion, PLLC

(57) ABSTRACT

To be able to successfully compensate the echos occurring in bidirectional telecommunications systems, comprising for example 2-wire/4-wire converters and/or AD/DA converters and/or satellite transmission links, the echo coupling factor and echo delay time for a system must be determined with a very high degree of accuracy and independently of the double talk situation. For this purpose, in accordance with the invention a process is provided wherein, by analyzing a dialogue, states and time segments are determined in which the probability of an incorrect evaluation of the coupling factor between the transmission paths and the echo delay time is very low. To improve the measurement accuracy, auxiliary quantities dependent upon the speech dynamics and the characteristic curve of the speech signal are introduced.

6 Claims, 1 Drawing Sheet

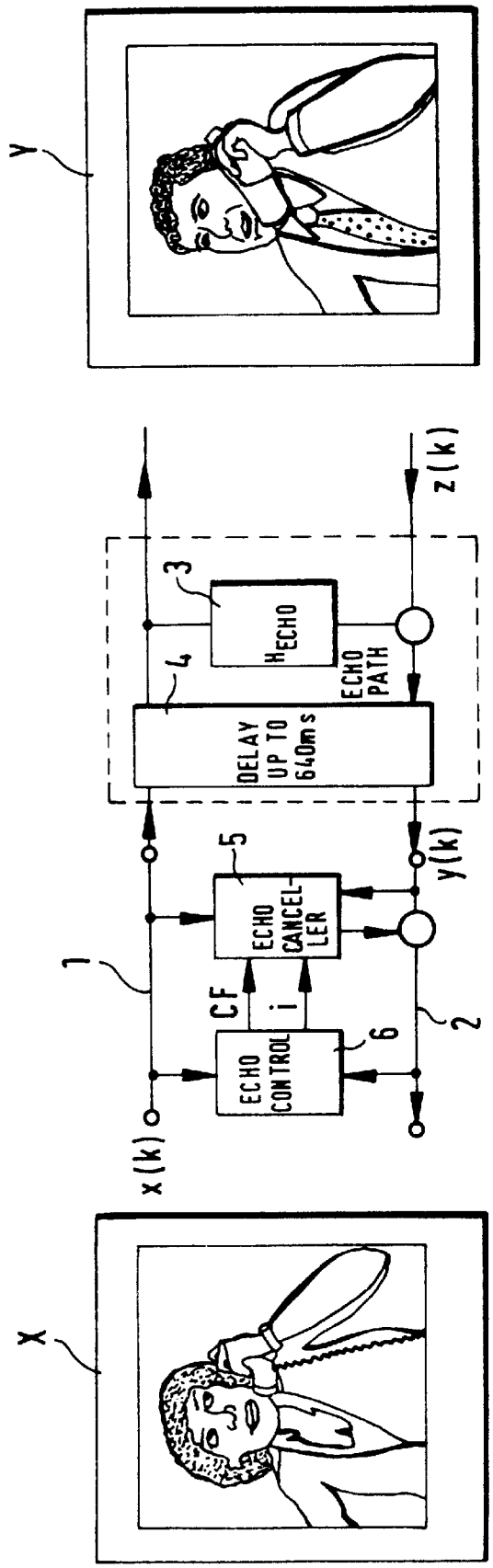

PROCESS FOR DETERMINING AN ECHO COUPLING FACTOR AND THE ECHO DELAY TIME IN A BIDIRECTIONAL TELECOMMUNICATIONS SYSTEM

BACKGROUND OF THE INVENTION

The invention relates to a process for determining an echo coupling factor and the echo delay time in a transmission system wherein an undesired coupling occurs between a receiving path and a transmitting path. This coupling gives rise to disturbing echos, the amplitude and delay time of which must be determined in order to be able to define the parameters of the transmission system and thus obtain a possible means of successfully compensating the echos. Echos occur as line echos in telecommunications systems due to electric coupling between the transmitting path and the receiving path and/or for example as acoustic echos in the case of handsfree telephones or auditorium sound systems due to acoustic coupling between loudspeaker and microphone. The degree of the coupling is defined by a coupling factor CF which indicates the ratio of the signal energy received at the echo reception location Y to the signal energy transmitted at the echo source X. Measured in dB, this ratio is also referred to as echo return loss ERL. For a sampled system the coupling factor CF is:

$$CF = \frac{\sum_{k=0}^{N}(y(k))^2}{\sum_{k=0}^{N}(x(k-i))^2} \quad (1)$$

wherein $x(k-i)$ = sampled value of the transmitted signal $y(k)$ = sampled value of the received signal, echo signal $N$ = number of sampled values of the exciting signal $i$ = echo delay time, digitalized The echo signal y(k) is delayed by i sample values compared to the transmitted signal x(k−i), namely by the delay time of the echo. An essential problem in determining the coupling factor CF consists in determining the echo delay time i in Equation (1) as accurately as possible. To determine the echo delay time i it is necessary to ascertain when the transmitted signal arrives at the echo reception location. As telecommunications systems are generally operated bidirectionally, the echo signal can be superimposed by a signal fed-in as useful signal at the remote end of the transmission path. This is the case whenever speech occurs simultaneously at the near end and the remote end of the transmission path. This is the so-called double talk situation. In the calculation of the coupling factor CF it must be ensured both that the echo delay time i is correctly set and that no double talk is occurring.

To detect an echo it is known to perform a correlation analysis in which the known transmitted signal x(k) is recorded in a time interval k=0 ... N and compared with the signal y(k) incoming at the echo reception location, see DE-A-42 29 910. The degree of correlation ρ then indicates the probability as to whether an echo ρ≈1 or a mixed signal ρ≈0 is present. The decision as to whether the correlation degree ρ is to be interpreted as an echo or a mixed signal produced by double talk, is made by a threshold value γ. The greater the selected threshold value γ, the less often are existing echos detected. Thus incorrect assessments are often made and the adaptation of the system is blocked. If, on the other hand, the selected threshold value γ is too small, the danger exists that the system will be adapted in double talk operation and become unstable. It is also disadvantageous that similarities between speech signals likewise give rise to incorrect decisions. Frequently spoken vowels can originate both from the echo generating subscriber and from the subscriber generating the double talk. The calculation outlay for the correlation analysis, comprising N multiplications, N additions and one division, is very high.

A process is also known for calculating a coupling factor in handsfree telephone systems in which, in order to reduce the calculation outlay, short-term mean values of the transmitted and received signals are obtained using recursive filters, see DE-A-44 30 189. Here the fact is exploited that the double talk times in a normal conversation are limited and the coupling factors in the case of double talk are always greater than in the case of a monologue. The specification of a minimum coupling factor in a time interval of several seconds eliminates incorrect decisions due to a temporary increase in the coupling factor in the case of double talk. The basic delay of the handsfree system is determined by the distance between sound generator and sound receiver and by the delay time due to the A/D, D/A converters, and is approximately constant. The coupling factor assessment error is reduced if the exciting signal is greater than a quiescent threshold value, at least in a defined time interval, whereby temporary disturbances are excluded from the assessment.

However, the precondition that the basic delay of the echo signal is approximately constant no longer applies in modern telecommunications systems and therefore the known processes do not produce the desired success.

SUMMARY OF THE INVENTION

The invention now achieves the object of providing a process for determining the echo coupling factor for telecommunications systems with echo delay times which change within a wide range, in order to achieve a required, rapid adaptation of an echo compensator. Particularly large echo delay times occur in the case of satellite transmission links and radio transmission links, for example according to the GSM standard, with a plurality of coder- and decoder circuits. To be able to implement cost-efficient echo compensator circuits, the calculation outlay for determining the echo coupling factor and echo delay time is to be as small as possible.

This object is achieved in accordance with the invention by a process wherein, by analyzing a dialogue, states and time segments in which the probability of an incorrect assessment is very low are determined. The echo delay time and echo coupling factor can be reliably determined only when the echo-generating subscriber starts speaking after a speech pause, either on his own part or on the part of the subscriber at the remote end of the transmission link. During a conversation it is not easily possible to make a reliable pronouncement on the properties of the transmission link.

BRIEF DESCRIPTION OF THE DRAWINGS

In the following the invention will be explained in the form of an exemplary embodiment. In the associated drawing the single figure provides a general view of a transmission link affected by an echo.

DETAILED DESCRIPTION OF THE INVENTION

In explanation of the facts, the figure shows a local subscriber X connected via a transmitting path 1 and a receiving path 2 to a subscriber Y at the remote end of a transmission link. The properties of the transmission link are symbolised by an echo generator 3 and a delay element 4. The subscriber X is assigned an echo compensator 5, the parameters of which are set by a control circuit 6 via the values of the coupling factor CF and the echo delay time i of an echo.

As a precondition for the identification of an echo, different states of a natural conversation between the subscriber X and the subscriber Y are defined by corresponding state variables xexc (E1), yexc (E2), P (E3), ybx (E4):

$$xexc = \begin{cases} 1 & \text{if } (SAM(x(k)) > LAM\ (x(k))) \\ 0 & \text{else} \end{cases} \quad (E1)$$

$$yexc = \begin{cases} 1 & \text{if } (SAM(y(k)) > LAM\ (y(k))) \\ 0 & \text{else} \end{cases} \quad (E2)$$

$$P = \begin{cases} 1 & \text{if } (xexc\ \&\ yexc \neq 1) \\ 0 & \text{else} \end{cases} \quad (E3)$$

$$ybx = \begin{cases} 1 & \text{if } (P(k-1) = 1\ \&\ yexc(k) = 1) \\ 0 & \text{if } (P(k) = 1) \end{cases} \quad (E4)$$

wherein $xexc$ ($x$-excitation) = excitation by subscriber $X$, subscriber $X$ speaks $yexc$ ($y$-excitation) = excitation by subscriber $Y$, subscriber $Y$ speaks $P$ = pause $ybx$ ($y$ before $x$) = subscriber $Y$ speaks before subscriber $X$ $SAM\ (x(k))$, $SAM\ (y(k))$ = short-term mean value of sampling function $x(k)$, $y(k)$ of transmitted signal, received signal of subscriber $X$, $LAM\ (x(k))$, $LAM\ (y(k))$ = long-term mean value of sampling function $x(k)$, $y(k)$ of transmitted signal, received signal of subscriber $X$.

If the short-term mean value SAM is greater than the long-term mean value LAM, this is an indication that speech is taking place and the speech stands out from a possible background noise. If the subscriber X is speaking, the state variable xexc=1 is set (E1), whereas if the subscriber Y is speaking, the state variable yexc=1 is set (E2). In other cases these state variables are zero. The state variable P for a speech pause becomes P=1 (E3) if neither the subscriber X nor the subscriber Y is speaking; if one of the two subscribers is speaking P=0. The state variable ybx is set as ybx=1 (E4) if the subscriber Y speaks first after a speech pause, and the signal then arriving at subscriber X cannot be evaluated as an echo.

To determine the echo delay time i, the time which elapses between the excitation by the subscriber X and the excitation by the subscriber Y is measured, the excitation registered by subscriber Y being produced by an echo caused by subscriber X. It must thus be ensured that the detected excitation yexc is not produced by double talk by the subscriber Y. Therefore the time measurement takes place after a speech pause because the probability that both subscribers X, Y will start speaking simultaneously after a speech pause is considerably less than in other conversation situations.

$$i_{neu} = \begin{cases} t_{y0} - t_{x0} & \text{if } (ybx \neq 1\ \&\ P_{x0-1} = 0) \\ \text{else } i_{alt} \end{cases} \quad (E5)$$

wherein $t_{x0}$=time of jump from $xexc$=0 to $xexc$=1

$t_{y0}$=time of jump from $yexc$=0 to $yexc$=1

The Equation (E5) describes the conditions for the measurement of the echo delay time i. If the subscriber Y has not spoken before the subscriber X, and thus ybx≠1, and there was previously a speech pause, thus $P_{(x0-1)}$=0, the time measurement is performed and a new echo delay time $i_{neu}$=$t_{y0}$-$t_{x0}$ is determined, where $t_{y0}$ indicates the time at which, excited by the sample value y(k) received by the subscriber X, the state variable yexc' jumps from the value 0 to the value 1. Accordingly the time $t_{x0}$ is defined for the jump in the state variables xexc from the value 0 to the value 1. If the conditions for an echo delay time measurement are not fulfilled, the previously measured echo delay time $i_{alt}$ is retained for setting the echo compensator.

The echo delay time is measured for example using a counter which is started at the time $t_{x0}$ and stopped at the time $t_{y0}$, so that the count is a measure of the echo delay time i.

During the measurement of the echo delay time, the conditions for determining the signal level for the calculation of the coupling factor CF are also fulfilled. In the determination of the signal levels, it is necessary to take into account the rise time constant τr of the input signal for the short-term mean value estimating device. Equation (E6) describes the conditions under which a measurement of the coupling factor CF is permitted:

$$CF_{neu} = \begin{cases} \text{if } (SAM(x(tx0)) > thrx)\ \&\ ybx \neq 1\ //\ (i_{imp} > 0) \\ = \dfrac{\max\ \{SAM(y(k));\ SAM(y(k-\tau r))\}}{\max\ \{SAM(x(k-i));\ sam(x(k-i-\tau r))\}} \\ \text{if } (i > mxdel)\ \&\&\ (SAM(y(k-\tau r)) < thry) \\ = CF_{min} \\ \text{else} \\ = CF_{alt} \end{cases} \quad (E6)$$

wherein $CF$ = coupling factor $CF_{new}$ = instantaneously calculated coupling factor $CF_{min}$ = minimum value of coupling factor $CF_{alt}$ = coupling factor from an earlier measurement $SAM(y(k))$ = short-term mean value of sampling function of signal received by subscriber $X$ delayed by the echo delay time $i$ -continued $SAM(x(k − i))$ = short-term mean value of sampling function of signal transmitted by subscriber $X$ $thrx$ = threshold value for the sampling function $x(k − i)$ $thry$ = threshold value for the sampling function $y(k)$ $i$ = echo delay time, digitalized $mxdel$ = maximum anticipated echo delay time, digitalized In order to calculate the coupling factor CF, in accordance with (E6) it is necessary to differentiate between three situations:

The coupling factor CF is recalculated from the quotient of the maximum of the short-term mean values of the received signals $y(k)$ in the time interval from $k-\tau r$ to $k$ and the maximum of the short-term mean values of the transmitted signals $x(k)$ in the time interval from $k-i-\tau r$ to $k-i$, when the excitation by the subscriber X has exceeded a specified threshold value thrx, i.e. $SAM(x(tx0))>thrx$, the subscriber Y has not spoken before the subscriber X, i.e. $ybx \ne 1$, or when the counter which measures the echo delay time has not yet been started i.e. $i>0$ cannot be specified since a measurement process is already in progress.

The value of the coupling factor CF is set at a minimum value $CF_{min}$ when the counter which measures the echo delay time has a count which corresponds to an echo delay time which is greater than the maximum possible echo delay time, i.e. $i>mxdel$, and when the short-term mean value of the signal received by the subscriber X is smaller than a specified threshold value thry, which means that an evaluatable excitation by the subscriber Y is not present, i.e. $SAM(y(k-\tau r))>thry$.

The previously determined value of the coupling factor $CF_{alt}$ is retained if the previously described conditions do not apply.

The threshold values thrx, thry introduced in Equation (E6) are auxiliary quantities for increasing the measuring accuracy of the coupling factor CF and the echo delay time i.

If a direct coupling occurs between the transmitted sampled signal $x(k)$ and the received sampled signal $y(k)$ due to hardware coupling at the interfaces of the A/D and D/A converters, which convert the analogue subscriber signal into a digital signal and vice versa, the danger exists that the echo delay time i will be incorrectly measured. Although this coupling is substantially smaller than the anticipated coupling occurring in the case of a 2-wire/4-wire conversion, it is still of a disturbing nature as the response threshold for the received sampled signal $y(k)$ for a correct echo delay time measurement, see Equation (E2), is very small, with the result that errors can occur in the measurement of the echo delay time. Therefore a threshold value thry according to Equation (E7) is defined:

$$thry = SAM(y(t_{x0}-t_{sys}))) \quad (E7).$$

The short-term mean value of the received signal $y(k)$ received after a time $t_{sys}$ following the start of the coupling measurement at the time $t_{x0}$ serves as threshold value thry. The time $t_{sys}$ represents the signal delay time which can occur due to the A/D and D/A converters, so that the threshold value thry is not defined until after this time has elapsed.

The threshold value thrx for the sampling function $x(k)$ of the transmitted signal determines the start time $t_{x0}$ for the measurement of the echo delay time i. This threshold value thrx is introduced on the one hand to prevent the echo delay time measurement from being started by non-stationary noises, and on the other hand to ensure that in a noise-filled environment the speaker who must stand out from a loud noise must determine the start time of the echo delay time measurement.

An advantageous method of determining the threshold value thrx consists in forming the quotient of a speech level sp1 and the anticipated dynamics of the speech signal dyn. This results in the advantage that the start time of the echo delay time measurement is better adapted to the speech signal.

The speech level is measured in accordance with the following equation (E8):

$$spl_{neu} = \begin{cases} SAM\ S\ (x(k)) & \text{if } (xexc = 1\ \&\ sc > \tau s) \\ spl_{alt} & \text{else} \end{cases} \quad (E8)$$

wherein $spl$ = estimated speech level $SAM\ S(x(k))$ = short-term mean value of the sampling function $x(k)$ $\tau s$ = minimum time of excitation $sc$ = time represented by a count of a counter (speech counter).

Equation (E8) states that the speech level spl is recalculated if the time represented by the count sc is greater than the minimum time of the excitation $\tau s$, $sc>\tau s$ and an excitation exists, $xexc=1$. Otherwise the previously measured value $spl_{alt}$ is retained.

The estimation of the instantaneous short-term mean value $SAM\ S\ (x(k))$ used in Equation (E8) takes place in accordance with the following Equation (E9):

$$SAM\ S(x(k)) = \begin{cases} |x(k)|\alpha l + SAM\ S(x(k-l))\beta l \\ \text{if } (xexc = l\ \&\ SAM\ S(x(k)) > SAM\ S(x(k-l))) \\ |x(k)|\alpha k + SAM\ S(x(k-l))\beta k \\ \text{if } (xexc = l\ \&\ SAM\ S(x(k)) < SAM\ S(x(k-l))) \\ spl\ \text{else} \end{cases} \quad (59)$$

wherein $\alpha l, \beta l$ = large time constant, digitalized $\alpha k, \beta k$ = small time constant, digitalized The estimation of the instantaneous short-term mean value $SAM\ S(x(k))$ takes place when the condition $sc>\tau s$ is fulfilled. Equation (E9) describes the estimation of the instantaneous short-term mean value $SAM\ S(x(k))$ in adaptation to the characteristic curve of the speech signal. In the case of a rising curve of the speech signal in accordance with $SAM\ S(x(k)) > SAM\ S(x(k-1))$, the short-term mean value $SAM\ S(x(k))$ is defined in accordance with Equation (E9) using a large time constant $\alpha l, \beta l$; if this condition is not fulfilled for the rising curve, the equation with the small time constant $\alpha k, \beta k$ is used. The digitalized values $\alpha l, \beta l, \alpha k, \beta k$ used in Equation (E9) represent the time constants $T_{\alpha l, \beta l} \leq 500$ ms and $T_{\alpha k, \beta k} \leq 100$ ms.

With the speech level spl determined in accordance with Equation (E8), the threshold value is:

$$thrx = \frac{spl}{dyn} \quad \text{(E10)}$$

wherein dyn indicates the anticipated speech dynamics, for example 20 dB. The threshold value thrx ensures that the excitation by the subscriber X is not caused by noise and that the excitation, and thus the start time of the measurement process for the echo delay time i, advantageously is dependent upon the speech dynamics.

With the process according to the invention, both in the case of acoustic echos and in the case of line echos, it is possible to determine the echo coupling factor and echo delay time in such manner that, in the consequently different attenuation range for acoustic echos (12 dB to −25 dB) and for line echos (40 dB to 6 dB) and with the consequently different delay times for acoustic echos (0 ms to 15 ms) and for line echos (0 ms to 640 ms), the parameters of the echo compensators can be reliably set so that disturbing echos are compensated. Here it was possible to reduce the calculation outlay in the process by approximately 90% compared to previously known processes.

The process is also unrestrictedly suitable for controlling a compander which can be used instead of the echo compensator 5 illustrated in the FIGURE.

What is claimed is:

1. A process for determining an echo coupling factor (CF) between the signals on a transmission path (1) in the transmitting direction and on a transmission path (2) in the receiving direction, and an echo delay time (i) of a transmitted signal (x(k)) and a received signal (y(k)) originating from the transmitted signal, the echo, in a telecommunication system consisting of transmission links with different transmission functions, and in which an information exchange takes place between a local subscriber (X), and a subscriber (Y) at the remote end of a transmission link, and in which at least one subscriber (X), (Y) is assigned an echo suppressor (5), the parameters of which are set via a control circuit (6) as a function of the echo coupling factor (CF) and the echo delay time (i), characterised in that during the information exchange between the local subscriber (X) and the subscriber (Y) at the remote end of the transmission link, characteristic states and time segments of the information are determined, upon which the measurement of the echo coupling factor (CF) and the measurement of the echo delay time (i) are rendered dependent.

2. A process according to claim 1, characterised in that characteristic states are:

only the local subscriber (X) supplies information (x(k)), only the subscriber (Y) at the remote end of the transmission link supplies information (z(k)), the subscriber (Y) at the remote end of the transmission link supplies information before the local subscriber (X) supplies information and that pauses are determined in which both the local subscriber (X) and the subscriber (Y) at the remote end of the transmission link do not supply any information.

3. A process according to claim 1, characterised in that the start time of the measurement of the echo coupling factor (CF) and of the measurement of the echo delay time (i) are rendered dependent upon the time function of the transmitted information in that, in the case of a speech transmission, a quotient of the speech level (spl) and the anticipated speech dynamics (dyn) is formed as threshold value (thrx) of the transmitted signal (x (k)) which permits measurement even in the case of noisy speech transmission.

4. A process according to claim 1, characterised in that the measurement of the echo coupling factor (CF) is only permitted when the short-term mean value (SAM(x(k))) has exceeded the threshold value (thrx) of the transmitted signal (x(k)) and the subscriber (Y) at the remote end of the transmission link has not supplied information before the local subscriber (X).

5. A process according to claim 1, characterised in that the measurement of the echo delay time (i) only takes place following a pause and the condition, that the subscriber (Y) at the remote end of the transmission link supplies information before the local subscriber (X), is not fulfilled.

6. A process according to claim 1, characterised in that the measurement of the echo delay time (i) and of the echo coupling factor (CF) does not take place if both the local subscriber (X) and the subscriber (Y) at the remote end of the transmission link supply information, a so-called double talk situation.

* * * * *